US012799261B2

(12) United States Patent
Fan et al.

(10) Patent No.: US 12,799,261 B2
(45) Date of Patent: Nov. 17, 2026

(54) SPANDEX FIBER WITH REVERSIBLE TRIPLE-SHAPE MEMORY EFFECT AND PREPARATION METHOD THEREOF

(71) Applicant: Wuyi University, Jiangmen (CN)

(72) Inventors: Longfei Fan, Jiangmen (CN); Lei Min, Jiangmen (CN); Hui Yu, Jiangmen (CN); Yuxiao Wu, Jiangmen (CN)

(73) Assignee: Wuyi University, Jiangmen (CN)

( * ) Notice: Subject to any disclaimer, the term of this patent is extended or adjusted under 35 U.S.C. 154(b) by 687 days.

(21) Appl. No.: 18/207,672

(22) Filed: Jun. 8, 2023

(65) Prior Publication Data

US 2023/0312807 A1 Oct. 5, 2023

Related U.S. Application Data

(63) Continuation-in-part of application No. PCT/CN2021/102662, filed on Jun. 28, 2021.

(30) Foreign Application Priority Data

Jan. 21, 2021 (CN) ........................ 202110085017.1

(51) Int. Cl.
*C08G 18/42* (2006.01)
*C08G 18/73* (2006.01)
*D01F 6/70* (2006.01)

(52) U.S. Cl.
CPC ....... *C08G 18/4277* (2013.01); *C08G 18/735* (2013.01); *D01F 6/70* (2013.01); *Y02P 70/62* (2015.11)

(58) Field of Classification Search
CPC .................................. Y02P 70/62; D01F 6/70
See application file for complete search history.

(56) References Cited

FOREIGN PATENT DOCUMENTS

| | | | |
|---|---|---|---|
| CN | 1706998 A | * | 12/2005 |
| CN | 101033286 A | | 9/2007 |
| CN | 112663168 A | | 4/2021 |
| JP | 2004231734 A | * | 8/2004 |

OTHER PUBLICATIONS

JP-2004231734-A, Aug. 19, 2004_English Translation.*
(Continued)

*Primary Examiner* — Michael L Leonard

(57) ABSTRACT

Disclosed are a spandex fiber with a reversible triple-shape memory effect and a preparation method thereof. In the present disclosure, the spandex fiber includes the following raw materials in parts by weight: 3 parts to 100 parts of a crystalline polyester diol or a crystalline polyether diol, 1 part to 30 parts of a diisocyanate, 0.1 parts to 15 parts of a polyurethane chain extender, and 0.2 parts to 11 parts of a polyurethane cross-linking agent, where the crystalline polyester diol or the crystalline polyether diol has a number-average molecular weight of 1,000-10,000 Daltons. The spandex fiber has a reversible deformation process, shows an ability to transform between "stretched" and "shortened" states infinitely under the action of a temperature field, and can memorize two temporary shapes. Moreover, the spandex fiber has easily accessible raw materials and a simple preparation method, and is suitable for large-scale industrial production.

7 Claims, 1 Drawing Sheet

(56) References Cited

OTHER PUBLICATIONS

CN-1706998-A, Dec. 14, 2005_English Translation.*
International Search Report of PCT Patent Application No. PCT/CN2021/102662 issued on Oct. 21, 2021.
Shaojun Chen et al., Triple shape memory effect in multiple crystalline polyurethanes, polymers advanced technologies, Aug. 11, 2009, pp. 377-380, vol. 21, No. 5.

* cited by examiner

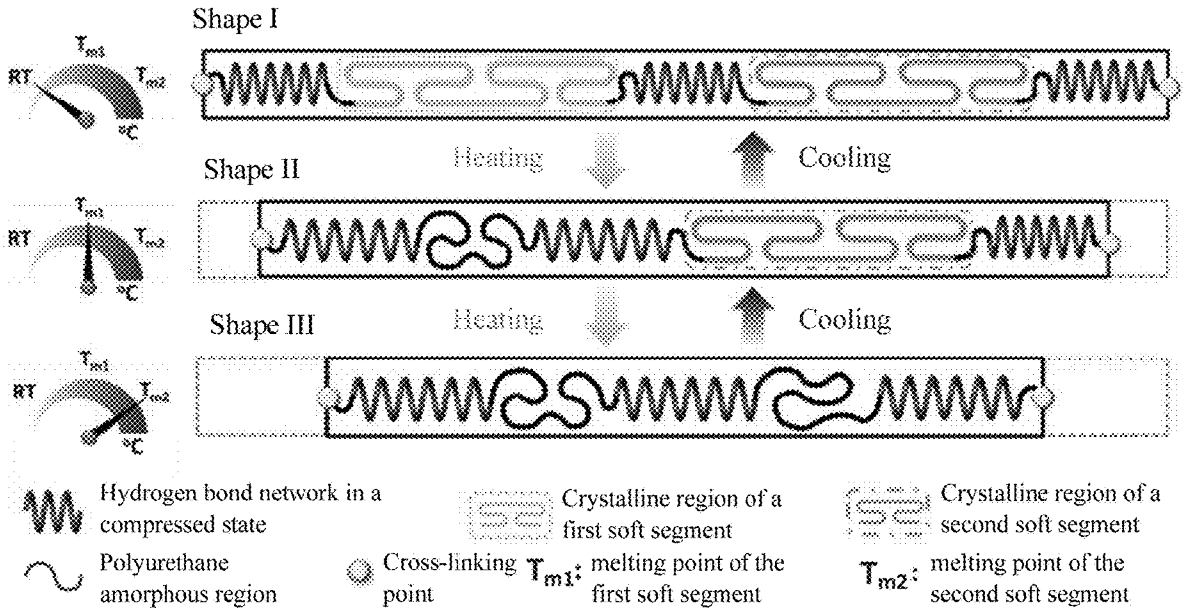
Shape I
RT
Shape II
Heating
Cooling
Shape III
Heating
Cooling
Hydrogen bond network in a compressed state
Crystalline region of a first soft segment
Crystalline region of a second soft segment
Polyurethane amorphous region
Cross-linking point
$T_{m1}$: melting point of the first soft segment
$T_{m2}$: melting point of the second soft segment

SPANDEX FIBER WITH REVERSIBLE TRIPLE-SHAPE MEMORY EFFECT AND PREPARATION METHOD THEREOF

CROSS-REFERENCE TO RELATED APPLICATIONS

The present application is a continuation-in-part application of PCT application No. PCT/CN2021/102662 filed on Jun. 28, 2021, which claims the benefit of Chinese Patent Application No. 202110085017.1 filed on Jan. 21, 2021. The contents of all of the aforementioned applications are incorporated by reference herein in their entirety.

TECHNICAL FIELD

The present disclosure belongs to the technical field of smart polymer materials, and in particular relates to a spandex fiber with a reversible triple-shape memory effect and a preparation method thereof.

BACKGROUND

Shape memory fibers can be divided into shape memory alloy fibers and shape memory polymer fibers according to their raw materials. The shape memory alloy fibers can achieve reversible deformation under thermal stimulation with the principle of martensite phase transformation. So far, the most commonly studied and applied shape memory fibers are nickel-titanium alloy fibers. A matrix material of the shape memory polymer fiber is a shape memory polymer (SMP). The SMP can produce recoverable deformation after receiving external stimuli. SMP has a "temporary shape" and a "permanent shape". The SMP can fix the temporary shape under certain external force and environmental conditions, and return to the permanent shape through the external stimuli such as light stimulation, thermal stimulation, and electrical stimulation. The polymer network of SMPs is potentially mobile. Under the external stimuli, the "transition" of the SMP is triggered, and strain energy stored in the temporary shape is released, thus eventually leading to the recovery of deformation. A shape memory effect mechanism of SMP does not depend on the principle of martensite phase transformation of shape memory alloys. The SMP fixes the permanent shape by cross-linking and the temporary shape by phase transition.

The SMP fibers widely used and studied at present are one-way SMP fibers. Common thermotropic SMP fibers are thermally stimulated (by heating or cooling) to trigger shape fixation and recovery. The one-way SMPs do not have reversible deformation. As a result, SMP fibers prepared based on these types of SMP also do not have reversible shape recovery, and can only transform from the temporary shape to the permanent shape. This makes such one-way SMP fibers only available as disposable products. The shortcomings above greatly limit the development prospects and application fields of the one-way SMP fibers, and also do not conform to the development concept of environmental protection in the world today.

SUMMARY

In order to solve the deficiencies in the prior art, an objective of the present disclosure is to provide a spandex fiber with a reversible triple-shape memory effect and a preparation method thereof.

To achieve the objective above, the present disclosure adopts the following technical solutions:

The present disclosure provides a spandex fiber with a reversible triple-shape memory effect, including the following raw materials in parts by weight:

| | |
|---|---|
| crystalline polyester diol or crystalline polyether diol | 3 parts to 100 parts; |
| diisocyanate | 1 part to 30 parts; |
| polyurethane chain extender | 0.1 parts to 15 parts; and |
| polyurethane cross-linking agent | 0.2 parts to 11 parts; |

wherein the crystalline polyester diol or the crystalline polyether diol has a number-average molecular weight of 1,000 Daltons to 10,000 Daltons.

Preferably, the crystalline polyester diol or the crystalline polyether diol is at least two selected from the group consisting of compounds with the following structural formulas:

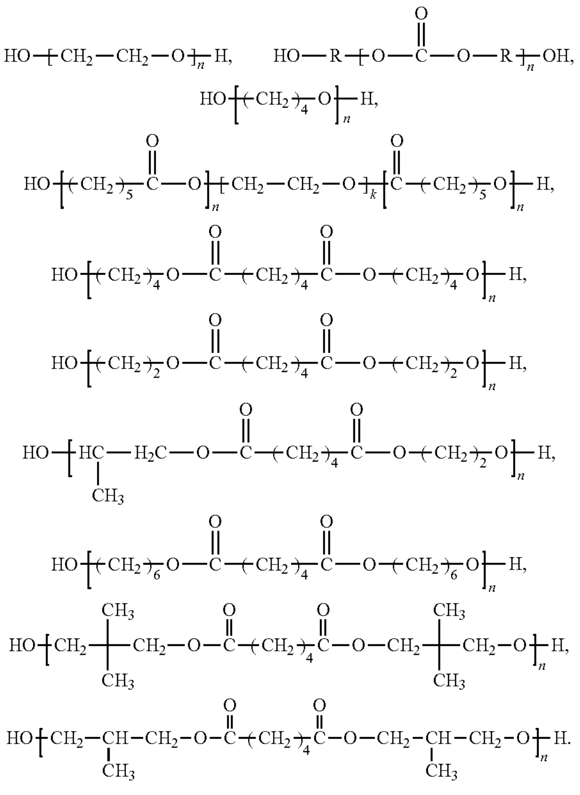

It should be noted that in the structural formulas above, n and k represent multiple and integer values, which can be 2, 3, 4, 5, 6, 7, 8, 9, 10, 11, 12, 15, 20, 30, 50, 60, 70, 80, 90, or 100, or other integer values; n and k have no upper limit theoretically. Preferably, the values of n and k only need to satisfy that the corresponding compounds have a molecular weight of not less than 1,000 Daltons and not more than 10,000 Daltons.

Preferably, the diisocyanate is at least one selected from the group consisting of compounds with the following structural formulas:

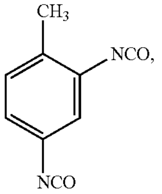,
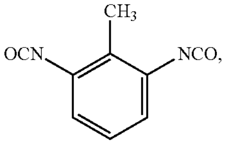,
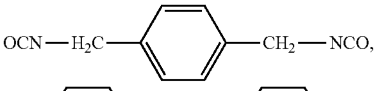,
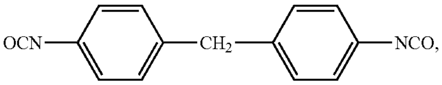,
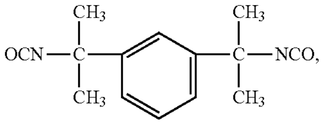,
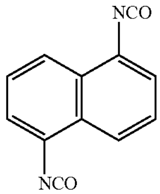,
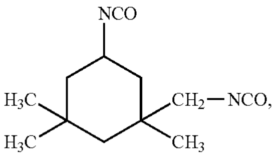,
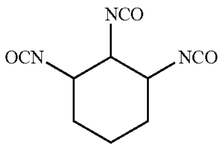,
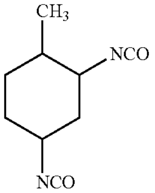
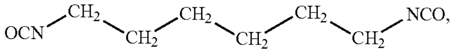,
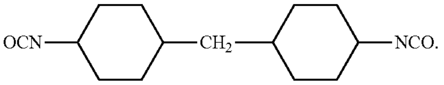.

Preferably, the polyurethane chain extender is at least one selected from the group consisting of small-molecule chain extenders, such as a diol compound, a diamine compound, a diacid compound, and a dimercaptan compound, including but not limited to 1,3-butanediol, 1,4-butanediol, 1,6-hexanediol, 1,2-propanediol, diethylene glycol ether, neopentyl glycol, 1,2-heptanediol, 1,7-heptanediol, 1,2-octanediol, 1,8-octanediol, 1,2-nonanediol, 1,9-nonanediol, 1,10-decanediol, 1,2-cyclohexanediol, estradiol, dipropylene glycol, dodecanol, 1,2-tetradecanediol, 2,8-quinolinediol, 1,2-hexadecanediol, 1,4-cyclohexanediol, 2,3-camphordiol, 1,12-dodecanediol, triethylene glycol, 2-ethyl-1,2-hexanediol, 1-phenyl-1,2-ethylene glycol, 3-methyl-1,3-butanediol, 1,4-butynediol, 3-chloro-1,2-propanediol, calcifediol, 2,5-dibromo-1,4-benzenediol, 2-ethyl-1,3-hexanediol, 2-butyl-1,3-propanediol, 1,4-dibromo-2,3-butanediol, 2,3-dibromo-1,4-butanediol, 2-methyl-2,4-pentanediol, 2,5-dimethyl-3-hexyne-2,5-diol, 2,5-dimethyl-2,5-hexanediol, 2,2,4-trimethyl-1,3-pentanediol, 2,3-pinanediol, 2-amino-1-phenyl-1,3-propanediol, 2-methyl-1,3-propanediol, 2-methyl-2-propyl-1,3-propanediol, 1-phenyl-1,2-ethanediol, 2,3-dihydroxypyridine, 1,4-bis(diphenylphosphino)-2,3-O-isopropylidene-2,3-butanediol, dodecaethylene glycol, 2,5-dihydroxy-1,4-dithiane, N-phenyldiethanolamine, 1H,2H, 10H, 10H-perfluoro-1,10-decanediol, 2-p-toluenesulfonic acid-1-phenyl-1,2-ethanediol, 3-tert-butylamino-1,2-propanediol, o-chlorophenylethylene glycol, 3,6-dithia-1,8-octanediol, 3,7-dithia-1,9-nonanediol, 1,3-adamantanediol, 3-benzyloxy-1,2-propanediol, 1,1-diphenyl-1,2-propanediol, tetraethylene glycol, malonic acid, decanedioic acid, adipic acid, glutaric acid, α-ketoglutaric acid, maleic acid, tetradecanedioic acid, undecanedioic acid, pentadecanedioic acid, succinic acid, dodecanedioic acid, suberic acid, behenic acid, fumaric acid, glutaric acid, pimelic acid, succinic acid, 3-(4-chlorophenyl) glutaric acid, 2,3-dibromosuccinic acid, 2,2-dimethylmalonic acid, cis-muconic acid, trans-1,2-cyclobutanedioic acid, phenylsuccinic acid, 3-thiophenemalonic acid, sebacic acid, 3-phenylglutaric acid, phenylmalonic acid, azelaic acid, butynedioic acid, 2-aminoadipic acid, adamantanemalonic acid, bromosuccinic acid, 2-methylglutaric acid, 5-methylisophthalic acid, phenylsuccinic acid, 3,3-dimethylglutaric acid, 2-aminosuberic acid, 2,2-dimethylglutaric acid, 3,6,9-trioxaundecanedioic acid, 2,3-dimercaptosuccinic acid, 1,2-cyclohexanedicarboxylic acid, 1,3-acetonedicarboxylic acid, 2,6-pyridinedicarboxylic acid, 2,2'-biphenyl dicarboxylic acid, 4,4'-stilbene dicarboxylic acid, DL-2-aminoadipic acid, ethylenediamine, oxalamide, p-phenylenediamine, 1,6-hexanediamine, m-phenylenediamine, cyanoguanidine, 4-bromo-1,2-phenylenediamine, N-Boc-m-phenylenediamine, N-benzylethylenediamine, naphthaleneethylenediamine, 4-nitro-o-phenylenediamine, 1,2-diphenylethylenediamine, (1,1'-binaphthyl)-2,2'-diamine, N-Boc-ethylenediamine, 4-chloro-o-phenylenediamine, N-Boc-p-phenylenediamine, N,N-diethylethylenediamine, 4,5-dichloro-o-phenylenediamine, N,N'-diphenylethylenediamine, 1,8-octyldiamine, 4-fluoro-1,2-phenylenediamine, N-(2-hydroxyethyl)ethylenediamine, m-phenylenediamine, N-phenyl-p-phenylenediamine, 1,2-propanediamine, 1,3-propanediamine, 1,2-cyclohexanediamine, 1,4-butanediamine, N,N-dimethylethylenediamine, 1,10-diaminodecane, N,N-diisopropylethylenediamine, 2-chloro-5-methyl-1,4-phenylenediamine, N-phenyl-o-phenylenediamine, N,N'-bis(3-aminopropyl)ethylenediamine, N,N'-diphenyl-p-phenylenediamine, 4,5-difluoro-1,2-phenylenediamine, 2-(trifluoromethyl)-1,4-phenylenediamine, 2-nitro-1,4-phenylenediamine, N,N-dimethyl-p-phenylenediamine, N-(tert-butoxycarbonyl)-1,4-butanediamine, N,N'-bis(2-hydroxyethyl)ethylenediamine, 1,2-cyclohexanediamine, N,N,N'-triphenylbenzidinediamine, N,N'-bis(salicylidene)-1,4-butanediamine, N,N'-bis(2-aminoethyl)-1,3-propanediamine, 2,5-dichloro-1,4-phenylenediamine, N,N,N',N'-tetramethyl-1,3-propylenediamine, bis(4-methoxybenzene)-1,2-ethylenediamine, 9,10-dihydro-9,10-ethyleneanthracene-11,12-diamine, tetrakis(4-methyloxyphenyl)-[1,1'-biphenyl]-4,4'-diamine, dimethyl-1,2-diphenyl-1,2-ethylenediamine, N,N,N,N-tetramethyl-1,6-hexanediamine, N,N'-dimethylcyclohexane-1,2-diamine, 1,2-diphenyl-1,2-ethylenediamine, 1,2-cyclohexanediamine, N,N-diethyl-1,3-propanediamine, 3,6,9-trioxaundecane-1,11-diamine, N,N'-dimethyl-1,3-propanediamine, 4-(hydroxyethoxy)-1,3-phenylenediamine hydrochloride, N-methyl-1,2-phenylenediamine, trimethylhexamethylenediamine, isophorone diamine, 2,7-diaminofluorene, 1,8-diaminonaphthalene, 1,12-diaminododecane, 2,6-diaminoanthraquinone, 9,10-diaminophenanthrene, 2,4-diaminoanisole, 1,4-diaminocyclohexane, 1,5-diaminopentane, 2,3-diaminonaphthalene, 2,3-diaminotoluene, urea, N,N'-vinylbisacrylamide, N-Boc-2,2'-(ethylenedioxy)diethylamine, benzidine, triethylenetetramine, 1,4-xylylenediamine, N,N'-dimethylethylenediamine, N-(2-hydroxyethyl)ethylenediamine, N,N'-dimethylcyclohexane-1,2-diamine, N-(p-toluenesulfonyl)-1,2-diphenylethylenediamine, 4,6-pyrimidinediamine, 4-acetamidoaniline, ethylenediamine, oxalamide, p-phenylenediamine, 1,6-hexanediamine, m-phenylenediamine, dicyandiamine, 4-bromo-1,2-phenylenediamine, N-Boc-m-phenylenediamine, N-benzylethylenediamine, naphthalene-ethylenediamine, 4-nitro-o-phenylenediamine, 1,2-diphenylethylenediamine, (1,1'-binaphthyl)-2,2'-diamine, N-Boc-ethylenediamine, 4-chloro-o-phenylenediamine, N-Boc-p-phenylenediamine, N,N-diethylethylenediamine, 4,5-dichloro-o-phenylenediamine, N,N'-diphenylethylenediamine, 1,8-octyldiamine, 4-fluoro-1,2-phenylenediamine, N-(2-hydroxyethyl)ethylenediamine, m-phenylenediamine, N-phenyl-p-phenylenediamine, 1,2-propylenediamine, 1,3-propylenediamine, 1,2-cyclohexanediamine, 1,4-butanediamine, N,N-dimethylethylenediamine, 1,10-diaminodecane, N,N-diisopropylethylenediamine, 2-chloro-5-methyl-1,4-phenylenediamine, N,N-dimethyl-p-phenylenediamine, N-phenyl-o-phenylenediamine, N-(tert-butoxycarbonyl)-1,4-butanediamine, N,N'-bis(3-aminopropyl)ethylenediamine, N,N'-bis(2-hydroxyethyl)ethylenediamine, N,N'-diphenyl-p-phenylenediamine, 1,2-cyclohexanediamine, 4,5-difluoro-1,2-phenylenediamine, N,N,N'-triphenylbiphenyl diamine, 2-(trifluoromethyl)-1,4-phenylenediamine, N,N'-bis(salicylidene)-1,4-butanediamine, 2-nitro-1,4-phenylenediamine, N,N'-bis(2-aminoethyl)-1,3-propanediamine, 2,5-dichloro-1,4-phenylenediamine, N,N,N',N'-tetramethyl-1,3-propylenediamine, bis(4-methoxybenzene)-1,2-ethylenediamine, 9,10-dihydro-9,10-ethyleneanthracene-11,12-diamine, tetrakis(4-methoxy phenyl)-[1,1'-biphenyl]-4,4'-diamine, dimethyl-1,2-diphenyl-1,2-ethylenediamine, N,N,N,N-tetramethyl-1,6-hexanediamine, N,N'-dimethylcyclohexane-1,2-diamine, 1,2-diphenyl-1,2-ethylenediamine, 1,2-cyclohexanediamine, N,N-diethyl-1,3-propanediamine, 3,6,9-trioxaundecane-1,11-diamine, N,N'-dimethyl -1,3-propylenediamine, 4-(hydroxyethoxy)-1,3-phenylenediamine hydrochloride, N-methyl-1,2-phenylenediamine, trimethylhexamethylenediamine, isophoronediamine, 2,7-diaminofluorene, 1,8-diaminonaphthalene, 1,12-diaminododecane, 2,6-diaminoanthraquinone, 9,10-diaminophenanthrene, 2,4-diaminoanisole, 1,4-diaminocyclohexane, 1,5-diaminopentane, 2,3-diaminonaphthalene, 2,3-diaminotoluene, urea, N,N'-ethylenebisacrylamide, N-Boc-2,2'-(ethylenedioxy) diethylamine, benzidine, triethylenetetramine, 1,4-xylylenediamine, N,N'-dimethylethylenediamine, N-(2-hydroxyethyl)ethylenediamine, N,N'-dimethylcyclohexane-1,2-diamine, N-(p-toluenesulfonyl)-1,2-diphenylethylenediamine, 4,6-pyrimidinediamine, 4-acetamidoaniline, dimercaptopropanol, 2,4-dimercaptopyrimidine, 2,6-dimercaptopurine, 1,6-hexanedithiol, toluene-3,4-dithiol, 1,3-propanedithiol, and 1,2-ethanedithiol.

Preferably, the polyurethane cross-linking agent is at least one selected from the group consisting of a polyol compound, a polyamine compound, a polyacid compound, and a polymercaptan compound, including but not limited to one or a mixture of more of trimethylolpropane tris(3-mercaptopropionate), pentaerythritol mercaptopropionate, glycerol, 1-(p-nitrophenyl)glycerin, 1,2,4-butanetriol, swainsonine, 1,2,4-benzenetriol, phytantriol, 1,8,9-trihydroxyanthracene, gallocatechin, catechin, 1-deoxynojirimycin, estriol, tris(hydroxymethyl)aminomethane, 1-thioglycerol, calcitriol, cyanuric acid, pentaerythritol, dipentaerythritol, threitol, erythritol, leucoquinizarin, voglibose, dithioerythritol, xylitol, dulcite, inositol, sorbitol, iohexol, N-(n-butyl)thiophosphoric triamide, 1,4,7-triazacyclononane, 3,3'-diaminodipropylamine, melamine, triethylenetetramine, and 3,3'-diaminobenzidine.

The present disclosure further provides a preparation method of the spandex fiber with a reversible triple-shape memory effect, including the following steps:

(1) synthesizing a polyurethane prepolymer A from the diisocyanate, a monomer a, and the polyurethane chain extender, wherein the monomer a is the crystalline polyester diol or the crystalline polyether diol;

(2) synthesizing a polyurethane prepolymer B from the diisocyanate, a monomer b, and the polyurethane chain extender, wherein the monomer b is the crystalline polyester diol or the crystalline polyether diol and is different from the monomer a;

(3) cooling the polyurethane prepolymer A obtained in step (1) and the polyurethane prepolymer B obtained in step (2) to a room temperature and mixing uniformly, adding the polyurethane cross-linking agent, and stirring uniformly to obtain a spinning solution;

(4) completely defoaming the spinning solution obtained in step (3), forming a spandex fiber through spinning, and heating the spandex fiber such that the polyurethane prepolymer A and the polyurethane prepolymer B react completely with the polyurethane cross-linking agent; and (5) heating a treated spandex fiber obtained in step (4) to melt crystalline regions and dissociate hydrogen bonds inside the spandex fiber; further elongating the spandex fiber by stretching, and fixing the spandex fiber with a clamp to prevent deformation; cooling to the room temperature, removing the clamp, such that the spandex fiber shrinks; heating to a melting end temperature of the spandex fiber to further shrink the spandex fiber; and after the shrinkage is completed, cooling to the room temperature to obtain the spandex fiber with a reversible triple-shape memory effect.

Preferably, in steps (1) and (2), the synthesizing is conducted under protection of an inert gas at 25° C. to 100° C. Preferably, in steps (1) and (2), an organotin catalyst is added during the synthesizing.

Preferably, in step (4), the spandex fiber is heated at 25° C. to 50° C. for 2 h to 24 h.

In step (5), a temperature range for heating the spandex fiber is between a hydrogen bond dissociation temperature and a thermo-oxidative degradation temperature of the spandex fiber.

A mechanism of the reversible triple-shape memory effect of the spandex fiber is as follows: the spandex fiber prepared by the present disclosure has two different crystalline soft segments inside, and can memorize two temporary shapes. During use, the temperature of spandex fiber is just increased to completely melt one of the crystalline soft segments, and the crystalline soft segment can melt from oriented crystals with a smaller entropy value and transform into a random coil state with a larger entropy value, the spandex fiber appears to be shortened in length macroscopically. When the temperature of spandex fiber continues to rise until another crystalline soft segment is completely melted, the spandex fiber can continue to shrink macroscopically. When the temperature is lowered to the point where one of the crystalline soft segments of the spandex fiber begins to crystallize, a molecular chain of the soft segment in the molten state crystallizes in orientation under a tensile stress provided by the hydrogen bond network, such that the spandex fiber shows an increase in length macroscopically. When the temperature is further lowered, another crystalline soft segment inside the spandex fiber begins to undergo oriented crystallization, and the spandex fiber may further elongate macroscopically. Therefore, the reversible deformation of the spandex fiber in the present disclosure among three shapes is cyclical with the change of temperature, thereby achieving the reversible triple-shape memory effect.

In some embodiments, the present disclosure provides a preparation method of a smart product, including using the spandex fiber with a reversible triple-shape memory effect, where the smart product is a smart polymer material or a smart textile.

In some embodiments, the present disclosure provides an actuator, including the spandex fiber with a reversible triple-shape memory effect as a raw material.

In some embodiments, the present disclosure provides a soft robot, including the spandex fiber with a reversible triple-shape memory effect as a raw material.

In some embodiments, the present disclosure provides a 4D printing method, including conducting 4D printing using the spandex fiber with a reversible triple-shape memory effect.

Compared with the prior art, the beneficial effects of the present disclosure are as follows: compared with the existing one-way SMP fibers, the spandex fiber with a reversible triple-shape memory effect provided by the present disclosure has the following outstanding advantages: the existing one-way SMP fibers can only achieve a one-time shape change under external stimuli. However, the spandex fiber provided in the present disclosure has a reversible deformation process, shows an ability to transform between "stretched" and "shortened" states infinitely under the action of a temperature field, and can memorize two temporary shapes. In addition, the spandex fiber has easily accessible raw materials and a simple preparation method, and is suitable for large-scale industrial production.

BRIEF DESCRIPTION OF THE DRAWINGS

The sole FIGURE shows a schematic diagram of a mechanism of the spandex fiber with a reversible triple-shape memory effect in the present disclosure in achieving the reversible triple-shape memory effect, wherein Shape I is a schematic diagram of an internal microstructure of the spandex fiber with a reversible triple-shape memory effect at a room temperature (RT);

Shape II is a schematic diagram of an internal microstructure of the spandex fiber with a reversible triple-shape memory effect in the present disclosure after heating up to $T_{m1}$($T_{m1}$>RT); a crystalline soft segment inside the spandex fiber melts from an oriented crystalline state to an isotropic state; therefore, the shrinkage of a molecular chain occurs, leading to the shrinkage of a shape of the spandex fiber macroscopically; a length of the spandex fiber at this time is shorter than that of the spandex fiber at the room temperature;

Shape III is a schematic diagram of an internal microstructure of the spandex fiber with a reversible triple-shape memory effect in the present disclosure after continuing to heat up to $T_{m2}$($T_{m2}$>$T_{m1}$); another crystalline soft segment inside the spandex fiber is melted from the oriented crystalline state to the isotropic state; therefore, the shrinkage of the molecular chain occurs, thus causing the secondary shrinkage of the shape of the spandex fiber macroscopically; a length of the spandex fiber at this time is shorter than that of the spandex fiber at the temperature $T_{m1}$; and on the contrary, when the temperature is lowered from the $T_{m2}$ to the $T_{m1}$ again, the crystalline soft segment inside the spandex fiber changes from a molten isotropic state to the oriented crystalline state under the action of internal stress, leading to elongation of a macroscopic shape of the spandex fiber, and this fiber returns from the Shape III to the Shape II; when the temperature continues to drop to the room temperature (RT), the another crystalline soft segment inside the spandex fiber changes from the molten isotropic state to the oriented crystalline state under the action of internal stress, leading to the macroscopic shape of the spandex fiber to further revert to the Shape I.

DETAILED DESCRIPTION

In the present disclosure, the term "crystalline polyester diol" refers to a crystalline polyester containing two terminal hydroxyl groups, and is generally prepared by polycondensation of a dicarboxylic acid (or anhydride) and a diol. The term "crystalline polyether diol" refers to a crystalline oligomer whose main chain contains an ether bond and whose end groups are two hydroxyl groups, and is generally formed by ring-opening polymerization of a small-molecule diol as an initiator and oxyalkylene under the action of a catalyst.

In the present disclosure, the term "melting limit" may also be referred to as a melting range, which means that since a crystalline polymer has an ambiguous melting temperature (melting point), its melting process occurs over a wide temperature range. The term "a melting end temperature" refers to a temperature corresponding to the complete melting (or melting termination) of the crystalline polymer; the "melting end temperature" may also be referred to as a "ceiling temperature of the melting limit" (or called Tm(end)).

In some embodiments, the present disclosure provides a preparation method of a spandex fiber with a reversible triple-shape memory effect, including the following steps:

(1) dissolving the diisocyanate and an organotin catalyst into a solvent, and then placing a resulting mixture in a reaction vessel under the protection of an inert gas; dissolving a monomer a into a solvent and adding an obtained solution into the reaction vessel, and conducting a reaction by stirring at 25° C. to 100° C. for 1 h to 3 h; adding an appropriate amount of the polyurethane chain extender, and conducting a reaction by stirring for 1 h to 3 h to obtain a polyurethane prepolymer A; where the monomer a is the crystalline polyester diol or the crystalline polyether diol;

(2) dissolving the diisocyanate and the organotin catalyst into a solvent, and then placing a resulting mixture in a reaction vessel under the protection of an inert gas; dissolving a monomer b into a solvent and adding an obtained solution into the reaction vessel, and conducting a reaction by stirring at 25° C. to 100° C. for 1 h to 3 h; adding the remaining polyurethane chain extender, and conducting a reaction by stirring for 1 h to 3 h to obtain a polyurethane prepolymer B; where the monomer b is the crystalline polyester diol or the crystalline polyether diol and is different from the monomer a;

(3) cooling the polyurethane prepolymer A obtained in step (1) and the polyurethane prepolymer B obtained in step (2) to a room temperature and mixing uniformly, adding the polyurethane cross-linking agent, and stirring uniformly to obtain a spinning solution;

(4) defoaming the spinning solution obtained in step (3) under vacuum and a room temperature to ensure that no air bubbles exist in the spinning solution; pressing the spinning solution into a pipeline through a metering pump, and extruding a thin stream of the spinning solution through a spinneret on a spinneret plate; where after the thin stream of the spinning solution ejected from the spinneret enters a hot tunnel, a solvent in the spinning solution is evaporated rapidly by a high-temperature air flow and is recovered from a lower outlet of the hot tunnel, and the thin stream of the spinning solution is solidified into long filaments and thinned, thus forming the spandex fiber; heating the spandex fiber at 25° C. to 50° C. for 2 h to 24 h, such that the polyurethane prepolymer A and the polyurethane prepolymer B react completely with the polyurethane cross-linking agent; and (5) heating a treated spandex fiber obtained in step (4) to melt crystalline regions and dissociate hydrogen bonds inside the spandex fiber; further elongating the spandex fiber by stretching, and fixing the spandex fiber with a clamp to prevent deformation; cooling to the room temperature, removing the clamp, such that the spandex fiber shrinks; heating to a melting end temperature of the spandex fiber to further shrink the spandex fiber; and after the shrinkage is completed, cooling to the room temperature to obtain the spandex fiber with a reversible triple-shape memory effect.

In the present disclosure, the working principle of the reversible triple-shape memory effect of the spandex fiber is as follows: as shown in the sole figure, the spandex fiber has a phase-separated structure, and internal crystalline regions of the untrained spandex fiber are randomly oriented. Heating the spandex fiber completely melts the two crystalline regions and dissociates the hydrogen bonds. In this state, the spandex fiber whose internal crystalline region is completely melted is stretched, and at this time, molecular chains inside the spandex fiber are oriented under the action of stress. The deformed spandex fiber is fixed at both ends and cooled to room temperature. At this time, two crystalline soft segments inside the spandex fiber crystallize in orientation under the action of external force, and the hydrogen bond network inside can be regenerated. At this point, the hydrogen bond network is in a state of no stress. The fixation at both ends of the spandex fiber are removed, and the fiber is heated to the ceiling temperature of its melting limit, the molecular chains inside the spandex fiber melt and retract, such that the stretched spandex fiber retracts. However, since the hydrogen bonds regenerated inside limit a retraction degree of the spandex fiber molecular chain, the fiber cannot be completely restored to its original state, and the regenerated hydrogen bond network is under stress at this time. After the temperature is lowered to room temperature, the internal crystalline soft segments crystallize under the stress provided by the hydrogen bond network and grow along the stress direction, such that a macroscopic length of the spandex fiber becomes higher. After the training above, the spandex fiber has a reversible shape memory effect. The spandex fiber has two different crystalline soft segments inside, and thus can memorize two temporary shapes. During the use, the temperature of spandex fiber is just increased to completely melt one of the crystalline soft segments, and the crystalline soft segment can melt from oriented crystals with a smaller entropy value and transform into a random coil state with a larger entropy value, the spandex fiber appears to be shortened in length macroscopically. When the temperature of spandex fiber continues to rise until another crystalline soft segment is completely melted, the spandex fiber can continue to shrink macroscopically. When the temperature is lowered to the point where one of the crystalline soft segments of the spandex fiber begins to crystallize, a molecular chain of the soft segment in the molten state crystallizes under a tensile stress provided by the hydrogen bond network, such that the spandex fiber shows an increase in length macroscopically. When the temperature is further lowered, another crystalline soft segment inside the spandex fiber begins to undergo oriented crystallization, and the spandex fiber may further elongate macroscopically. Obviously, the reversible deformation of the spandex fiber in the present disclosure among the three shapes is cyclical with the change of temperature, thereby achieving the reversible triple-shape memory effect.

The technical solutions of the present disclosure will be further described below in conjunction with examples. Apparently, the described examples are merely some rather than all of the examples of the present disclosure. All other embodiments obtained by a person skilled in the art based on the embodiments of the present application without creative efforts should fall within the protection scope of the present application. The raw materials, solvents, and reagents used in the examples are all commercially available. Unless otherwise specified, the "parts" mentioned in the examples all refer to parts by weight.

EXAMPLE 1

1.11 parts of 1,6-hexamethylene diisocyanate (HDI) and two drops of dibutyltin dilaurate (DBTDL) were dissolved in an appropriate amount of dichloromethane, and placed in a three-necked flask under the protection of argon at 60° C.; 9 parts of polycaprolactone diol was dissolved in an appropriate amount of dichloromethane, then added into a three-necked flask and stirred for 1 h; and 0.13 parts of a chain extender 1,4-butanediol (BDO) was added and reacted by stirring for 1 h to obtain a polyurethane prepolymer A. 2.59 parts of the 1,6-hexamethylene diisocyanate (HDI) and two drops of the dibutyltin dilaurate (DBTDL) were dissolved in an appropriate amount of dichloromethane, and placed in a three-necked flask under the protection of argon at 60° C.; 20.3 parts of polytetrahydrofuran diol was dissolved in an appropriate amount of dichloromethane, then added into a three-necked flask and stirred for 1 h; and 0.3 parts of the chain extender 1,4-butanediol (BDO) was added and reacted by stirring for 1 h to obtain a polyurethane prepolymer B. The polyurethane prepolymer A and the polyurethane prepolymer B that were cooled to room temperature were mixed and stirred for 30 min, and 1.91 parts of a cross-linking agent trimethylolpropane tris(3-mercaptopropionate) (TMPMP) was added and stirred evenly. A spinning solution with a mass fraction of 35% was prepared by regulating an amount of the dichloromethane.

The spinning solution was defoamed at room temperature for 30 min in a vacuum environment to ensure that no air bubbles existed in the spinning solution. The spinning solution was pressed into a pipeline through a metering pump, and a thin stream of the spinning solution was extruded through a spinneret on a spinneret plate; where after the thin stream of the spinning solution ejected from the spinneret entered a hot tunnel at 120° C., a solvent in the spinning solution was evaporated rapidly by a high-temperature air flow and was recovered from a lower outlet of the hot tunnel, and the thin stream of the spinning solution was solidified into long filaments and thinned, thus forming the spandex fiber. The spandex fiber was heated at 50° C. for 2 h, such that the polyurethane prepolymers reacted completely with the polyurethane cross-linking agent.

The spandex fiber was heated to melt crystalline regions and dissociate hydrogen bonds inside; the spandex fiber was further elongated by stretching, and fixed the spandex fiber with a clamp to prevent deformation; the spandex fiber was cooled to the room temperature, the clamp was removed, such that the spandex fiber shrunk slightly. The spandex fiber was heated to a melting end temperature of the spandex fiber to further shrink the spandex fiber; and the shrinkage was completed to obtain the spandex fiber with a reversible triple-shape memory effect.

EXAMPLE 2

1.85 parts of 1,6-hexamethylene diisocyanate (HDI) and two drops of dibutyltin dilaurate were dissolved in an appropriate amount of dichloromethane, and placed in a three-necked flask under the protection of argon at 60° C.; 15 parts of polycaprolactone diol was dissolved in an appropriate amount of dichloromethane, then added into a three-necked flask and stirred for 1 h; and 0.22 parts of a chain extender 1,4-butanediol was added and reacted by stirring for 1 h to obtain a polyurethane prepolymer A. 1.85 parts of the 1,6-hexamethylene diisocyanate and two drops of the dibutyltin dilaurate were dissolved in an appropriate amount of dichloromethane, and placed in a three-necked flask under the protection of argon at 60° C.; 14.5 parts of polytetrahydrofuran diol was dissolved in an appropriate amount of dichloromethane, then added into a three-necked flask and stirred for 1 h; and 0.3 parts of the chain extender 1,4-butanediol was added and reacted by stirring for 1 h to obtain a polyurethane prepolymer B. The polyurethane prepolymer A and the polyurethane prepolymer B that were cooled to room temperature were mixed and stirred for 30 min, and 1.91 parts of a cross-linking agent trimethylolpropane tris(3-mercaptopropionate) was added and stirred evenly. A spinning solution with a mass fraction of 35% was prepared by regulating an amount of the dichloromethane.

The spinning solution was defoamed at room temperature for 30 min in a vacuum environment to ensure that no air bubbles existed in the spinning solution. The spinning solution was pressed into a pipeline through a metering pump, and a thin stream of the spinning solution was extruded through a spinneret on a spinneret plate; where after the thin stream of the spinning solution ejected from the spinneret entered a hot tunnel at 120° C., a solvent in the spinning solution was evaporated rapidly by a high-temperature air flow and was recovered from a lower outlet of the hot tunnel, and the thin stream of the spinning solution was solidified into long filaments and thinned, thus forming the spandex fiber. The spandex fiber was heated at 50° C. for 2 h, such that the polyurethane prepolymers reacted completely with the polyurethane cross-linking agent.

The spandex fiber was heated to melt crystalline regions and dissociate hydrogen bonds inside; the spandex fiber was further elongated by stretching, and fixed the spandex fiber with a clamp to prevent deformation; the spandex fiber was cooled to the room temperature, the clamp was removed, such that the spandex fiber shrunk slightly. The spandex fiber was heated to a melting end temperature of the spandex fiber to further shrink the spandex fiber; and the shrinkage was completed to obtain the spandex fiber with a reversible triple-shape memory effect.

EXAMPLE 3

2.75 parts of diphenylmethane diisocyanate and two drops of dibutyltin dilaurate were dissolved in an appropriate amount of dichloromethane, and placed in a three-necked flask under the protection of argon at 60° C.; 15 parts of polycaprolactone diol was dissolved in an appropriate amount of dichloromethane, then added into a three-necked flask and stirred for 1 h; and 0.22 parts of a chain extender 1,4-butanediol was added and reacted by stirring for 1 h to obtain a polyurethane prepolymer A. 2.75 parts of the diphenylmethane diisocyanate and two drops of the dibutyltin dilaurate were dissolved in an appropriate amount of dichloromethane, and placed in a three-necked flask under the protection of argon at 60° C.; 14.5 parts of polytetrahydrofuran diol was dissolved in an appropriate amount of dichloromethane, then added into a three-necked flask and stirred for 1 h; and 0.3 parts of the chain extender 1,4-butanediol was added and reacted by stirring for 1 h to obtain a polyurethane prepolymer B. The polyurethane prepolymer A and the polyurethane prepolymer B that were cooled to room temperature were mixed and stirred for 30 min, and 1.91 parts of a cross-linking agent trimethylolpropane tris(3-mercaptopropionate) was added and stirred evenly. A spinning solution with a mass fraction of 35% was prepared by regulating an amount of the dichloromethane.

The spinning solution was defoamed at room temperature for 30 min in a vacuum environment to ensure that no air bubbles existed in the spinning solution. The spinning solution was pressed into a pipeline through a metering pump, and a thin stream of the spinning solution was extruded through a spinneret on a spinneret plate; where after the thin stream of the spinning solution ejected from the spinneret entered a hot tunnel at 120° C., a solvent in the spinning solution was evaporated rapidly by a high-temperature air flow and was recovered from a lower outlet of the hot tunnel, and the thin stream of the spinning solution was solidified into long filaments and thinned, thus forming the spandex fiber. The spandex fiber was heated at 50° C. for 2 h, such that the polyurethane prepolymers reacted completely with the polyurethane cross-linking agent.

The spandex fiber was heated to melt crystalline regions and dissociate hydrogen bonds inside; the spandex fiber was further elongated by stretching, and fixed the spandex fiber with a clamp to prevent deformation; the spandex fiber was cooled to the room temperature, the clamp was removed, such that the spandex fiber shrunk slightly. The spandex fiber was heated to a melting end temperature of the spandex fiber to further shrink the spandex fiber; and the shrinkage was completed to obtain the spandex fiber with a reversible triple-shape memory effect.

EXAMPLE 4

1.11 parts of 1,6-hexamethylene diisocyanate and two drops of dibutyltin dilaurate were dissolved in an appropriate amount of dichloromethane, and placed in a three-necked flask under the protection of argon at 60° C.; 9 parts of polycaprolactone diol was dissolved in an appropriate amount of dichloromethane, then added into a three-necked flask and stirred for 1 h; and 0.13 parts of a chain extender 1,4-butanediol was added and reacted by stirring for 1 h to obtain a polyurethane prepolymer A. 2.59 parts of the 1,6-hexamethylene diisocyanate and two drops of the dibutyltin dilaurate were dissolved in an appropriate amount of dichloromethane, and placed in a three-necked flask under the protection of argon at 60° C.; 20.3 parts of polytetrahydrofuran diol was dissolved in an appropriate amount of dichloromethane, then added into a three-necked flask and stirred for 1 h; and 0.3 parts of the chain extender 1,4-butanediol (BDO) was added and reacted by stirring for 1 h to obtain a polyurethane prepolymer B. The polyurethane prepolymer A and the polyurethane prepolymer B that were cooled to room temperature were mixed and stirred for 30 min, and 0.6 parts of a cross-linking agent glycerol was added and stirred evenly. A spinning solution with a mass fraction of 35% was prepared by regulating an amount of the dichloromethane.

The spinning solution was defoamed at room temperature for 30 min in a vacuum environment to ensure that no air bubbles existed in the spinning solution. The spinning solution was pressed into a pipeline through a metering pump, and a thin stream of the spinning solution was extruded through a spinneret on a spinneret plate; where after the thin stream of the spinning solution ejected from the spinneret entered a hot tunnel at 120° C., a solvent in the spinning solution was evaporated rapidly by a high-temperature air flow and was recovered from a lower outlet of the hot tunnel, and the thin stream of the spinning solution was solidified into long filaments and thinned, thus forming the spandex fiber. The spandex fiber was heated at 50° C. for 2 h, such that the polyurethane prepolymers reacted completely with the polyurethane cross-linking agent.

The spandex fiber was heated to melt crystalline regions and dissociate hydrogen bonds inside; the spandex fiber was further elongated by stretching, and fixed the spandex fiber with a clamp to prevent deformation; the spandex fiber was cooled to the room temperature, the clamp was removed, such that the spandex fiber shrunk slightly. The spandex fiber was heated to a melting end temperature of the spandex fiber to further shrink the spandex fiber; and the shrinkage was completed to obtain the spandex fiber with a reversible triple-shape memory effect.

EXAMPLE 5

1.85 parts of 1,6-hexamethylene diisocyanate and two drops of dibutyltin dilaurate were dissolved in an appropriate amount of dichloromethane, and placed in a three-necked flask under the protection of argon at 60° C.; 15 parts of polycaprolactone diol was dissolved in an appropriate amount of dichloromethane, then added into a three-necked flask and stirred for 1 h; and 0.15 parts of a chain extender ethylene glycol was added and reacted by stirring for 1 h to obtain a polyurethane prepolymer A. 1.85 parts of the 1,6-hexamethylene diisocyanate and two drops of the dibutyltin dilaurate were dissolved in an appropriate amount of dichloromethane, and placed in a three-necked flask under the protection of argon at 60° C.; 14.5 parts of polytetrahydrofuran diol was dissolved in an appropriate amount of dichloromethane, then added into a three-necked flask and stirred for 1 h; and 0.15 parts of the chain extender ethylene glycol was added and reacted by stirring for 1 h to obtain a polyurethane prepolymer B. The polyurethane prepolymer A and the polyurethane prepolymer B that were cooled to room temperature were mixed and stirred for 30 min, and 1.91 parts of a cross-linking agent trimethylolpropane tris(3-mercaptopropionate) was added and stirred evenly. A spinning solution with a mass fraction of 35% was prepared by regulating an amount of the dichloromethane.

The spinning solution was defoamed at room temperature for 30 min in a vacuum environment to ensure that no air bubbles existed in the spinning solution. The spinning solution was pressed into a pipeline through a metering pump, and a thin stream of the spinning solution was extruded through a spinneret on a spinneret plate; where after the thin stream of the spinning solution ejected from the spinneret entered a hot tunnel at 120° C., a solvent in the spinning solution was evaporated rapidly by a high-temperature air flow and was recovered from a lower outlet of the hot tunnel, and the thin stream of the spinning solution was solidified into long filaments and thinned, thus forming the spandex fiber. The spandex fiber was heated at 50° C. for 2 h, such that the polyurethane prepolymers reacted completely with the polyurethane cross-linking agent.

The spandex fiber was heated to melt crystalline regions and dissociate hydrogen bonds inside; the spandex fiber was further elongated by stretching, and fixed the spandex fiber with a clamp to prevent deformation; the spandex fiber was cooled to the room temperature, the clamp was removed, such that the spandex fiber shrunk slightly. The spandex fiber was heated to a melting end temperature of the spandex fiber to further shrink the spandex fiber; and the shrinkage was completed to obtain the spandex fiber with a reversible triple-shape memory effect.

Comparative Example 1

1.85 parts of 1,6-hexamethylene diisocyanate and two drops of dibutyltin dilaurate were dissolved in an appropriate amount of dichloromethane, and placed in a three-necked flask under the protection of argon at 60° C.; 15 parts of polycaprolactone diol was dissolved in an appropriate amount of dichloromethane, then added into a three-necked flask and stirred for 1 h; and 0.22 parts of a chain extender 1,4-butanediol was added and reacted by stirring for 1 h to obtain a polyurethane prepolymer. The polyurethane prepolymer was cooled to room temperature, and 0.96 parts of a cross-linking agent trimethylolpropane tris(3-mercaptopropionate) was added and stirred evenly. A spinning solution with a mass fraction of 35% was prepared by regulating an amount of the dichloromethane.

The spinning solution was defoamed at room temperature for 30 min in a vacuum environment to ensure that no air bubbles existed in the spinning solution. The spinning solution was pressed into a pipeline through a metering pump, and a thin stream of the spinning solution was extruded through a spinneret on a spinneret plate; where after the thin stream of the spinning solution ejected from the spinneret entered a hot tunnel at 120° C., a solvent in the spinning solution was evaporated rapidly by a high-temperature air flow and was recovered from a lower outlet of the hot tunnel, and the thin stream of the spinning solution was solidified into long filaments and thinned, thus forming the spandex fiber. The spandex fiber was heated at 50° C. for 2 h, such that the polyurethane prepolymers reacted completely with the polyurethane cross-linking agent.

The spandex fiber was heated to melt crystalline regions and dissociate hydrogen bonds inside; the spandex fiber was further elongated by stretching, and fixed the spandex fiber with a clamp to prevent deformation; the spandex fiber was cooled to the room temperature, the clamp was removed, such that the spandex fiber shrunk slightly. The spandex fiber was heated to a melting end temperature of the spandex fiber to further shrink the spandex fiber; and the shrinkage was completed to obtain the spandex fiber with a reversible shape memory effect.

Comparative Example 2

1.11 parts of 1,6-hexamethylene diisocyanate and two drops of dibutyltin dilaurate were dissolved in an appropriate amount of dichloromethane, and placed in a three-necked flask under the protection of argon at 60° C.; 9 parts of polycaprolactone diol was dissolved in an appropriate amount of dichloromethane, then added into a three-necked flask and stirred for 1 h; and 0.13 parts of a chain extender 1,4-butanediol was added and reacted by stirring for 1 h to obtain a polyurethane prepolymer A. 2.59 parts of the 1,6-hexamethylene diisocyanate and two drops of the dibutyltin dilaurate were dissolved in an appropriate amount of dichloromethane, and placed in a three-necked flask under the protection of argon at 60° C.; 20.3 parts of polytetrahydrofuran diol was dissolved in an appropriate amount of dichloromethane, then added into a three-necked flask and stirred for 1 h; and 0.3 parts of the chain extender 1,4-butanediol (BDO) was added and reacted by stirring for 1 h to obtain a polyurethane prepolymer B. The polyurethane prepolymer A and the polyurethane prepolymer B that were cooled to room temperature were mixed and stirred for 30 min, and 1.91 parts of a cross-linking agent trimethylolpropane tris(3-mercaptopropionate) was added and stirred evenly. A spinning solution with a mass fraction of 35% was prepared by regulating an amount of the solvent.

The spinning solution was defoamed at room temperature for 30 min in a vacuum environment to ensure that no air bubbles existed in the spinning solution. The spinning solution was pressed into a pipeline through a metering pump, and a thin stream of the spinning solution was extruded through a spinneret on a spinneret plate; where after the thin stream of the spinning solution ejected from the spinneret entered a hot tunnel at 120° C., a solvent in the spinning solution was evaporated rapidly by a high-temperature air flow and was recovered from a lower outlet of the hot tunnel, and the thin stream of the spinning solution was solidified into long filaments and thinned, thus forming the spandex fiber.

Performance Testing:

A reversible shape memory effect of the resulting materials was evaluated by dynamic mechanical analysis (DMA). Each spandex fiber obtained in Examples 1 to 5 and Comparative Examples 1 to 2 was cut into fiber samples meeting the requirements of a DMA test, and the DMA test was conducted. The test conditions were: in a tensile mode without any stress, heating was conducted from −20° C. at 1° C./min to 60° C., and the temperature was held for 2 min, and then cooling was conducted at 1° C./min to −20° C., and the temperature was held for 2 min. In this way, the strain of the sample under test changing with temperature was tested in the temperature change above. The temperature change process was repeated 5 times, and an average strain of the tested sample in 5 cycles was calculated. The test results were shown in Table 1.

TABLE 1

Test results of reversible strain of spandex fiber

| Sample | Average total reversible strain (%) | Average reversible strain of PCL soft segment (%) | Average reversible strain of PTMEG soft segment (%) |
|---|---|---|---|
| Example 1 | 12.12 | 5.46 | 6.66 |
| Example 2 | 10.75 | 8.77 | 1.98 |
| Example 3 | 10.32 | 8.23 | 2.09 |
| Example 4 | 11.88 | 5.12 | 6.76 |
| Example 5 | 9.93 | 7.97 | 1.96 |
| Comparative Example 1 | 15.56 | 15.56 | 0.00 |
| Comparative Example 2 | 0.00 | 0.00 | 0.00 |

Finally, it should be noted that the embodiments above are provided merely to describe the technical solutions of the present disclosure, rather than to limit the protection scope of the present disclosure. Although the present disclosure is described in detail with reference to preferred embodiments, a person of ordinary skill in the art should understand that modifications or equivalent replacements may be made to the technical solutions of the present disclosure without departing from the spirit and scope of the technical solutions of the present disclosure.

The invention claimed is:

1. A preparation method of a spandex fiber with a reversible triple-shape memory effect, wherein the spandex fiber comprises the following raw materials in parts by weight:

| | |
|---|---|
| crystalline polyester diol or crystalline polyether diol | 3 parts to 100 parts; |
| diisocyanate | 1 part to 30 parts; |
| polyurethane chain extender | 0.1 parts to 15 parts; and |
| polyurethane cross-linking agent | 0.2 parts to 11 parts; |

wherein the crystalline polyester diol or the crystalline polyether diol has a number-average molecular weight of 1,000 Daltons to 10,000 Daltons; and wherein the preparation method comprises the following steps:

(1) synthesizing a polyurethane prepolymer A from the diisocyanate, a monomer a, and the polyurethane chain extender, wherein the monomer a is the crystalline polyester diol or the crystalline polyether diol;

(2) synthesizing a polyurethane prepolymer B from the diisocyanate, a monomer b, and the polyurethane chain extender, wherein the monomer b is the crystalline polyester diol or the crystalline polyether diol and is different from the monomer a;

(3) cooling the polyurethane prepolymer A obtained in step (1) and the polyurethane prepolymer B obtained in step (2) to a room temperature and mixing uniformly, adding the polyurethane cross-linking agent, and stirring uniformly to obtain a spinning solution;

(4) completely defoaming the spinning solution obtained in step (3), forming a spandex fiber through spinning, and heating the spandex fiber such that the polyurethane prepolymer A and the polyurethane prepolymer B react completely with the polyurethane cross-linking agent; and (5) heating a treated spandex fiber obtained in step (4) to melt crystalline regions and dissociate hydrogen bonds inside the spandex fiber; elongating the spandex fiber by stretching, and fixing the spandex fiber with a clamp to prevent deformation; cooling to the room temperature, and removing the clamp, such that the spandex fiber shrinks; heating to a melting end temperature of the spandex fiber to further shrink the spandex fiber; and after the shrinkage is completed, cooling to the room temperature to obtain the spandex fiber with a reversible triple-shape memory effect, wherein the polyurethane cross-linking agent is at least one selected from the group consisting of a polyamine compound, a polyacid compound, and a polymercaptan compound.

2. The preparation method of the spandex fiber with a reversible triple-shape memory effect according to claim 1, wherein in steps (1) and (2), the synthesizing is conducted under protection of an inert gas at 25°C to 100°C.

3. The preparation method of the spandex fiber with a reversible triple-shape memory effect according to claim 1, wherein in steps (1) and (2), an organotin catalyst is added during the synthesizing.

4. The preparation method of the spandex fiber with a reversible triple-shape memory effect according to claim 1, wherein in step (4), the spandex fiber is heated at 25°C to 50°C for 2 h to 24 h.

5. The preparation method of the spandex fiber with a reversible triple-shape memory effect according to claim 1, wherein the polyurethane chain extender is at least one selected from the group consisting of a diol compound, a diamine compound, a diacid compound, and a dimercaptan compound.

6. The preparation method of the spandex fiber with a reversible triple-shape memory effect according to claim 1, wherein the crystalline polyester diol or the crystalline polyether diol is at least two selected from the group consisting of compounds with the following structural formulas:

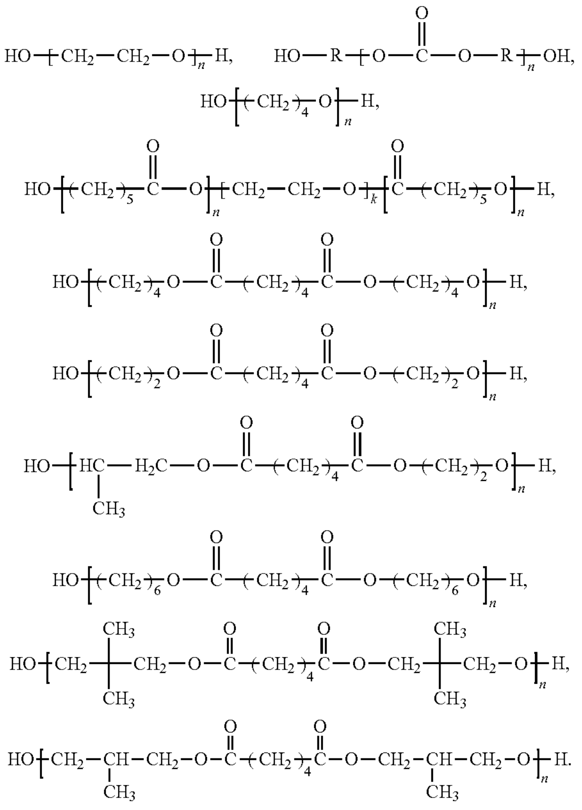

7. The preparation method of the spandex fiber with a reversible triple-shape memory effect according to claim 1, wherein the diisocyanate is at least one selected from the group consisting of compounds with the following structural formulas:

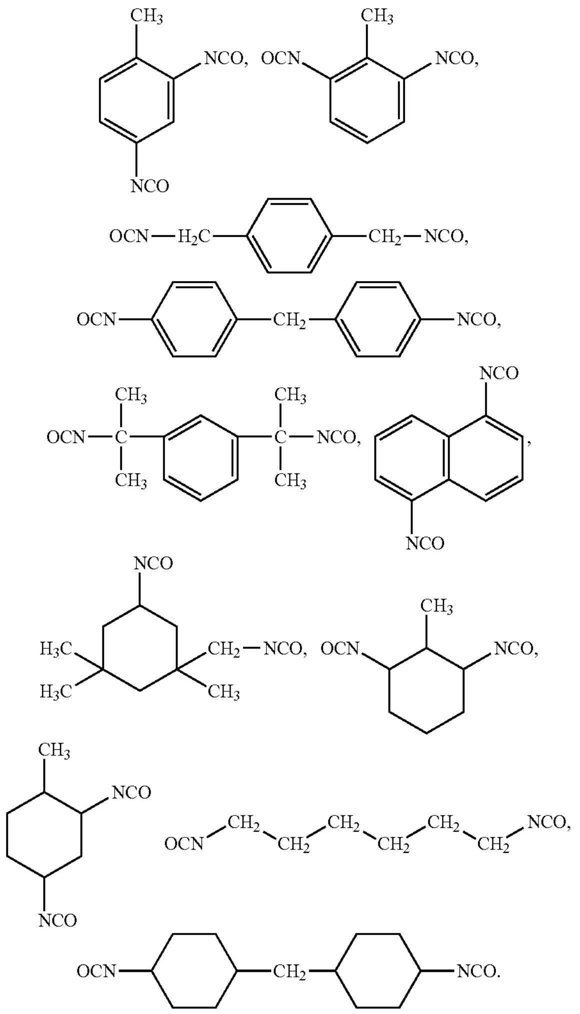

* * * * *